United States Patent
Thomas et al.

(10) Patent No.: US 10,454,823 B1
(45) Date of Patent: Oct. 22, 2019

(54) PACKET PROCESSING IN A ROUTING INSTANCE THAT IS DISTRIBUTED ACROSS AT LEAST TWO DIFFERENT ROUTING STACKS

(71) Applicant: Juniper Networks, Inc., Sunnyvale, CA (US)

(72) Inventors: Reji Thomas, Bangalore (IN); Vivek Ramesh, Kottayam (IN); Pranavadatta Devaki Narasimha Bhatta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 65 days.

(21) Appl. No.: 15/892,297

(22) Filed: Feb. 8, 2018

(51) Int. Cl.
  *H04L 12/741* (2013.01)
  *H04L 12/801* (2013.01)
  *H04L 12/713* (2013.01)

(52) U.S. Cl.
  CPC ............ *H04L 45/74* (2013.01); *H04L 45/586* (2013.01); *H04L 47/17* (2013.01)

(58) Field of Classification Search
  CPC ........ H04L 45/74; H04L 45/586; H04L 47/17
  See application file for complete search history.

(56) References Cited

U.S. PATENT DOCUMENTS

2009/0296579 A1* 12/2009 Dharwadkar ....... H04L 12/4641
  370/235

2014/0192808 A1* 7/2014 Thubert ................. H04L 45/74
  370/392

* cited by examiner

*Primary Examiner* — Curtis A Alia
(74) *Attorney, Agent, or Firm* — John C. Pokotylo; Pokotylo Patent Services

(57) ABSTRACT

The problem of processing an egress packet by a data forwarding device having (1) a first routing stack associated with a first namespace and a first interface, (2) a second routing stack associated with a second namespace and a second interface, wherein at least some forwarding information included in the second namespace is incompatible with the first routing stack, (3) a virtual routing and forwarding instance (VRF), and (4) a shared session layer socket associated with both the first and second routing stack, and bound to the VRF, where the VRF is associated with the second interface via the second routing stack, is solved by: adding the first interface to the VRF whereby the VRF is associated with both the first and second interfaces; and responsive to the adding of the first interface to the VRF, (1) adding routes from the second namespace to the first namespace such that network address prefixes of the second namespace are associated with a "special" next hop, and (2) flagging the shared session layer socket bound to the VRF. When an egress packet on the flagged shared session layer socket is received, the data forwarding device (1) sends the egress packet to the first routing stack for processing, (2) looks up next hop information using the first namespace of the first routing stack, and (3) determines whether or not the next hop information is a "special" next hop. Responsive to a determination that the next hop information is a "special" next hop, the data forwarding device injects the egress packet into the second routing stack for processing.

20 Claims, 12 Drawing Sheets

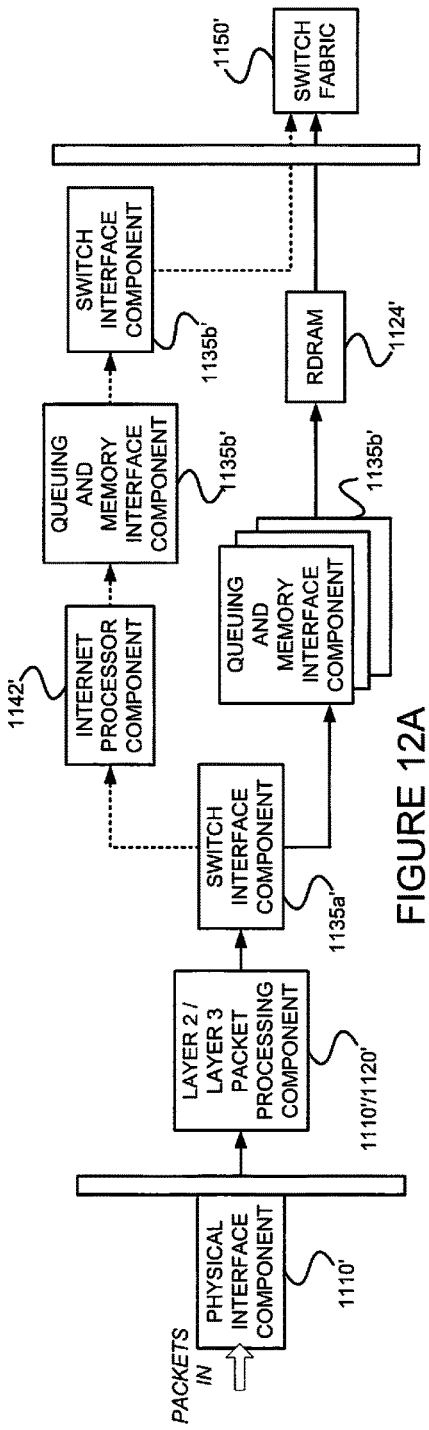
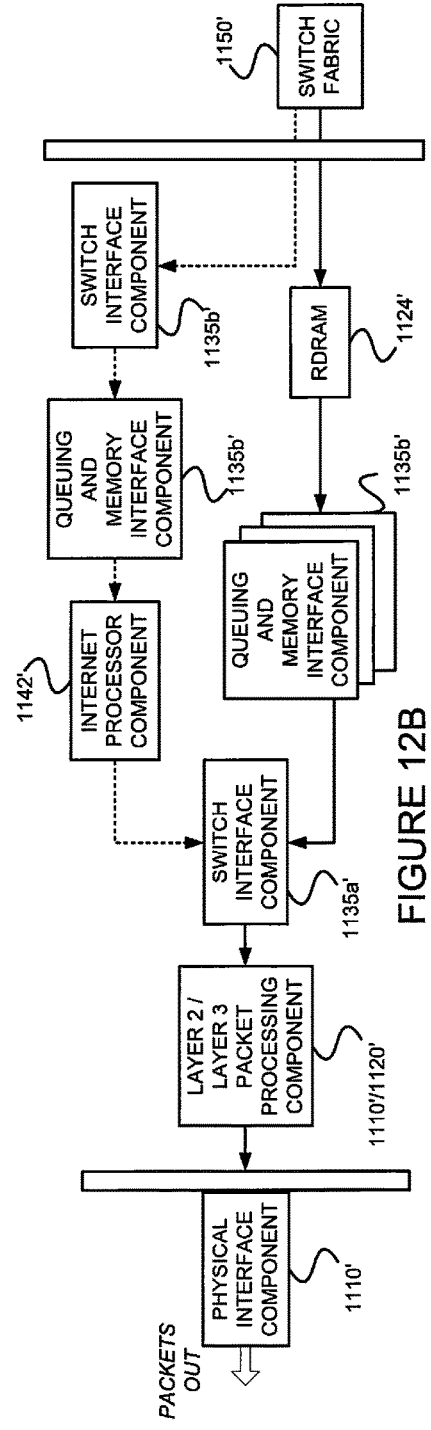
FIGURE 12A
FIGURE 12B

PACKET PROCESSING IN A ROUTING INSTANCE THAT IS DISTRIBUTED ACROSS AT LEAST TWO DIFFERENT ROUTING STACKS

§ 1 BACKGROUND OF THE INVENTION

§ 1.1 Field of the Invention

The present invention concerns network communications. More specifically, the present invention concerns processing packets in a routing instance that is distributed across at least two different routing stacks.

§ 1.2 Background Information

§ 1.2.1 TCP/IP Conceptual Model

FIG. 1 illustrates a conceptual model 100 and set of communications protocols used on the Internet and similar computer networks. The conceptual model 100 is slightly modified from the model commonly referred to as the Internet protocol suite or TCP/IP. The conceptual model 100 provides end-to-end data communication specifying how data should be packetized, addressed, transmitted, routed, and received. This functionality is organized into abstraction layers which classify all related protocols according to the scope of networking involved. From lowest to highest, the abstraction layers include a physical layer 112, a data link or network layer 114, an Internet layer 120, a transport layer 130, and an application layer 160 (which includes a session layer 150). The physical and network layers 112/114 collectively 110 provide communication methods for data that remains within a single network segment (link). The Internet layer 120 provides internetworking between independent networks. The transport layer 130 handles host-to-host communication. Finally, the application layer 160 provides process-to-process data exchange for applications. As shown, the session layer 150 may be considered to be part of the application layer 160.

In the conceptual model 100, encapsulation is used to provide abstraction of protocols and services. Encapsulation is usually aligned with the division of the protocol suite into layers of general functionality. In general, an application (the highest level of the model) uses a set of protocols to send its data down the layers, being further encapsulated at each level. The layers of the protocol suite near the top are logically closer to the user application, while those near the bottom are logically closer to the physical transmission of the data. Viewing layers as providing or consuming a service is a method of abstraction to isolate the layers from needing to know the details of the other layers.

§ 1.2.2 Virtual Routing and Forwarding ("VRF") Devices

Virtual routing and forwarding ("VRF") is an IP technology that allows multiple instances of a routing table to coexist on the same router at the same time. The VRF device (also referred to as a "VRF instance", or simply a "VRF") combined with IP rules provides the ability to create virtual routing and forwarding domains in a (e.g., Linux) network stack. Referring to FIG. 2, processes can be "VRF aware" by binding a socket 150 to the VRF device 210. Packets through the socket 150 then use the routing stack 220 and a routing table provided in the namespace 230 associated with the VRF device 210. Packets received on an enslaved device are switched to the VRF device in the IPv4 and IPv6 processing stacks giving the impression that packets flow through the VRF device. Similarly, on egress, routing rules are used to send packets to the VRF device driver before getting sent out the actual interface.

In addition, VRF devices allow VRFs to be nested within namespaces. For example network namespaces provide separation of network interfaces at the device layer, VLANs on the interfaces within a namespace provide L2 separation and then VRF devices provide L3 separation.

A VRF instance can be thought of as another name for network namespace functionality. A namespace is a way of scoping a particular set of identifiers. By using a namespace, the same identifier can be used multiple times in different namespaces. An identifier set visible to particular processes can also be restricted using namespaces.

For example, Linux provides namespaces for networking and processes, among other things. If a process is running within a process namespace, it can only see and communicate with other processes in the same namespace.

In a network namespace, the scoped 'identifiers' are network devices; so a given network device exists in a particular namespace. Linux starts up with a default network namespace where all the network devices will be located absent special configuration. However, it is also possible to create further non-default namespaces, and create new devices (e.g., VRFs) in those namespaces, or to move an existing device from one namespace to another.

Each network namespace also has its own routing table, and in fact this is the main reason for namespaces to exist. A routing table is keyed by destination IP address, so network namespaces are useful if it is desired to have the same destination IP address mean different things at different times. Each network namespace also has its own set of IP tables (for both IPv4 and IPv6). So, it is possible to apply different security to flows with the same IP addressing in different namespaces, as well as different routing.

Any given Linux process runs in a particular network namespace. By default this is inherited from its parent process, but a process with the right capabilities can switch itself into a different namespace. Suppose such a process sends out a message to IP address A.B.C.D, the effect of the namespace is that A.B.C.D will be looked up in the routing table of that namespace, and that will determine the network device that the message is transmitted through.

§ 1.2.3 Management Interfaces and Challenges when Using VRF Devices with Management Interfaces Management interfaces are used to access communications devices (e.g., routers) remotely. Typically, a management interface is not connected to an in-band network (also referred to as "the data plane," but rather, is connected to a device in an internal network. Through a management interface, the device can be accessed over the network using utilities such as secure shell (ssh) and telnet. In this way, the device can be configured from anywhere, regardless of its physical location. (Although, for purposes security, users normally cannot log in as root through a management interface. To access the device as root, users must typically use a console port.) Management interface port ranges vary based on device type. The simple network management protocol (SNMP) can use a management interface to gather statistics from the device.

Many types of Junos OS platforms (from Juniper Networks, Inc., in Sunnyvale, Calif.) include a dedicated management port on the front panel. For others, one of the Ethernet ports can be configured to act as the management interface. A network interface can be configured as being dedicated to out-of-band management, or as being shared by both management and network traffic. Even if a device has a dedicated management port, it might be preferred to configure a network interface to carry management traffic. For example, this approach might be used when cost does not justify a separate management infrastructure. A dedicated management port supports out-of-band (also referred to as "control plane") management access with complete physical separation from network traffic within your device. This approach limits access to the device, and thereby limits the potential for problems. Further, because it only carries management traffic, the management port is fully available for analyzing and reacting to issues if the device happens to be under attack. Configuration of a dedicated management port may require assignment of the IP address that is to be used as the management interface. The interface name used depends on the type of device being set up. Some devices use a management Ethernet interface (e.g., me0 on Juniper routers), some use an out-of-band management interface port (e.g., fxp0 on Juniper routers), and some use an internal interface (e.g., em0 on Juniper routers).

Referring to FIG. 3, in systems in which a data plane 310 and a control plane 320 are separate (such as in routers from Juniper Networks, Inc.), there can be a scenario where an out-of-band interface(s) 380 of the control plane 320 is managed by a native stack routing infrastructure 370 (also referred to more generically as "routing stack B"), whereas a data plane interface(s) 340 and its routes are managed by a proprietary routing infrastructure 340 (also referred to more generically as "routing stack A"). For instance consider the case on a router where the management and internal interfaces 380 are managed by native linux/FreeBSD IP routing 370, whereas data plane interfaces 340 are managed by routing vendor's proprietary routing stack 330. It could also be that the socket layer 350 would be shared between these two stacks 330/370 even though the routing infrastructure (the routing table, for example), interfaces and allied objects and their representation are different between these (and hence exist in their own namespaces 360/390).

In such systems there can be requirements where a VRF instance (simply referred to as "VRF") 395 needs to be extended between these different IP stack infrastructures 330/370. (A common scenario is where the management (i.e., control) plane 320 separation needs to be achieved by creating a separate management VRF 395 and this management VRF 395 needs to include both in-band interface(s) 340 and out-of-band interface(s) 380. This is a common configuration for achieving redundancy for management protocols like Terminal Access Controller Access Control System (TACACS), network time protocol (NTP), etc.) There is a potential problem when processing egress packets, however. For example, if the packet is a data packet, it should be processed via the (e.g., proprietary) routing stack A 330 using routing information in namespace A 360, whereas if the packet is a control packet, it should be processed via the (e.g., native) routing stack B 370 using routing information in namespace B 390. However, information in the namespace A 360 will likely be incompatible with information in the namespace B 390. For example, referring to FIGS. 3 and 4, the routing information 410 in namespace A 360'/400 is not compatible with the routing information 510 in namespace B 390'/500. Thus, there is a need for special consideration when processing an egress packet when a VRF uses different routing stacks with different namespaces (e.g., via a shared session layer—or shared socket), such as when a VRF is bound with both at least one in-band interface and at least one out-of-band interface via different routing stacks.

§ 2 SUMMARY OF THE INVENTION

The problem of processing an egress packet by a data forwarding device having (1) a first routing stack associated with a first namespace and a first (e.g., in-band data plane) interface, (2) a second routing stack associated with a second namespace and a second (e.g., out-of-band control plane) interface, wherein at least some forwarding information included in the second namespace is incompatible with the first routing stack, (3) a virtual routing and forwarding instance (VRF), and (4) a shared session layer socket associated with both the first routing stack and the second routing stack, and bound to the VRF, where the VRF is associated with the second (e.g., out-of-band control plane) interface via the second routing stack, is solved by: (a) adding the first (e.g., in-band data plane) interface to the VRF whereby the VRF is associated with both the first (e.g., in-band data plane) interface and the second (e.g., out-of-band control plane) interface; and (b) responsive to the adding of the first (e.g., in-band data plane) interface to the VRF, (1) adding routes from the second namespace to the first namespace such that network address prefixes of the second namespace are associated with a "special" next hop, and (2) flagging the shared session layer socket bound to the VRF. When the egress packet is received, it is determined whether or not the egress packet is on the flagged shared session layer socket. Responsive to determining that the egress packet is on the flagged shared session layer socket, the data forwarding device (1) sends the egress packet to the first routing stack for processing, (2) looks up next hop information using the first namespace of the first routing stack, and (3) determines whether or not the next hop information is a "special" next hop. Responsive to a determination that the next hop information is a "special" next hop, the data forwarding device injects the egress packet into the second routing stack for processing. Otherwise, responsive to a determination that the next hop information is not a "special" next hop, the data forwarding device forwards the egress packet with the first routing stack using the next hop information.

In some example embodiments consistent with the present invention, the first routing stack is a proprietary routing stack and the second routing stack is a native routing stack.

In some example embodiments consistent with the present invention, the second (e.g., out-of-band control plane) interface is used by a remote management protocol.

In some example embodiments consistent with the present invention, the out-of-band control plane interface is one of (A) an internal Ethernet interface (Recall, e.g., interfaces em0 and em1 in Juniper routers.), and (B) an external, remote management, Ethernet interface (Recall, e.g., interface fxp0 in Juniper routers.).

In some example embodiments consistent with the present invention, the VRF uses the both the first (e.g., in-band data plane interface) and the second (e.g., out-of-band control plane) interface to provide redundancy in a management protocol. In some such example embodiments, the management protocol is either Terminal Access Controller Access Control System (TACACS), or Network Time Protocol (NTP).

In some example embodiments consistent with the present invention, the egress packet is injected into the second routing stack, via a logical tunnel, for processing.

In some example embodiments consistent with the present invention, the first namespace includes a first forwarding information base (FIB) and the second namespace includes a second FIB.

§ 3 BRIEF DESCRIPTION OF THE DRAWINGS

FIGS. 12A and 12B illustrate example packet forwarding operations of the example distributed ASICs of FIG. 11.

§ 4 DETAILED DESCRIPTION

§ 4.1 Example Methods

Figure 1:
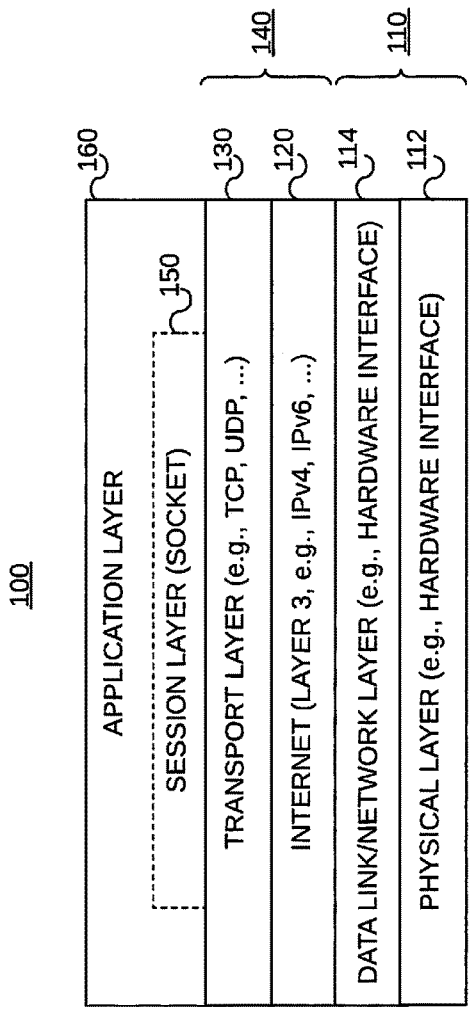
FIG. 1 illustrates a conceptual model and a set of communications protocols used on the Internet and similar computer networks.
Figure 2:
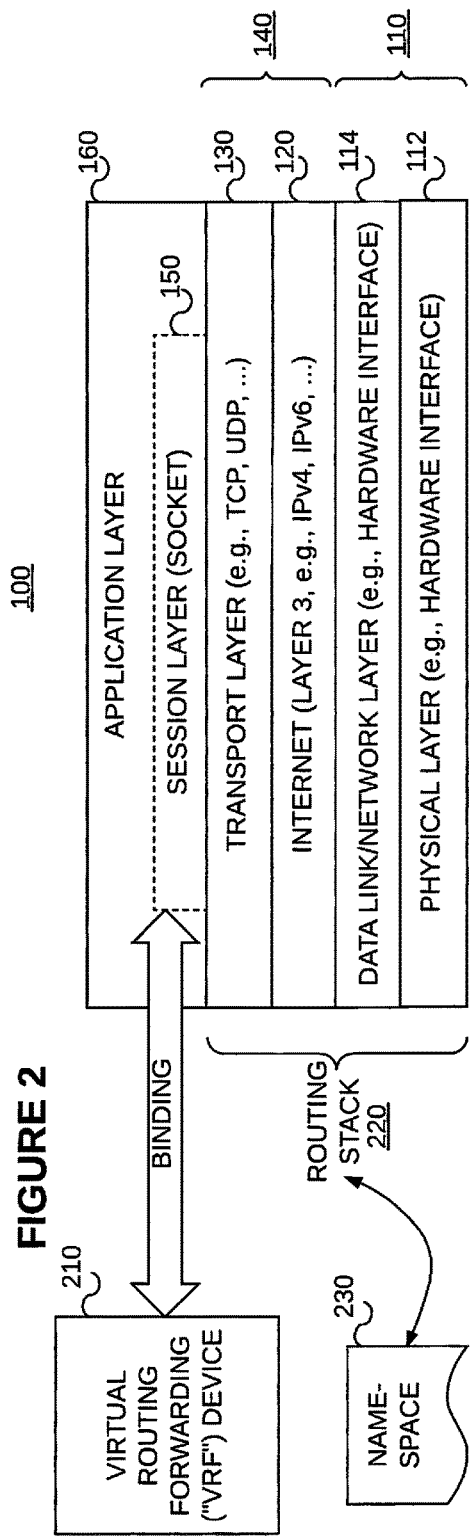
FIG. 2 illustrates the concepts of a virtual routing forwarding device, a namespace, and a routing stack in the context of the conceptual model of FIG. 1.

Example embodiments consistent with the present invention may be implemented on a data forwarding device such as the one described above reference to FIG. 3. That is, the data forwarding device may include (1) a first routing stack 330 associated with a first namespace 360 and a first (e.g., in-band data plane) interface 340, (2) a second routing stack 370 associated with a second namespace 390 and a second (e.g., out-of-band control plane) interface 380, wherein at least some forwarding information included in the second namespace 390 is incompatible with the first routing stack 330, (3) a VRF device or instance 395, and (4) a shared session layer socket 350 associated with the first routing stack 330 and the second routing stack 370 and bound to the VRF instance 395, wherein the VRF 395 is associated with the second (e.g., out-of-band control plane) interface 380 via the second routing stack 370. Some interfaces (e.g., in-band interfaces 340) are managed by the first routing stack 330, whereas the rest of the interfaces (e.g., out-of-band interfaces 380) are managed by the second routing stack 370. In the example device of FIG. 3, an out-of-band interface 380 is managed by the second (e.g., native) routing stack B 370, whereas the in-band interfaces 340 are managed by the first (e.g., proprietary) routing stack A 330.

Figure 6:
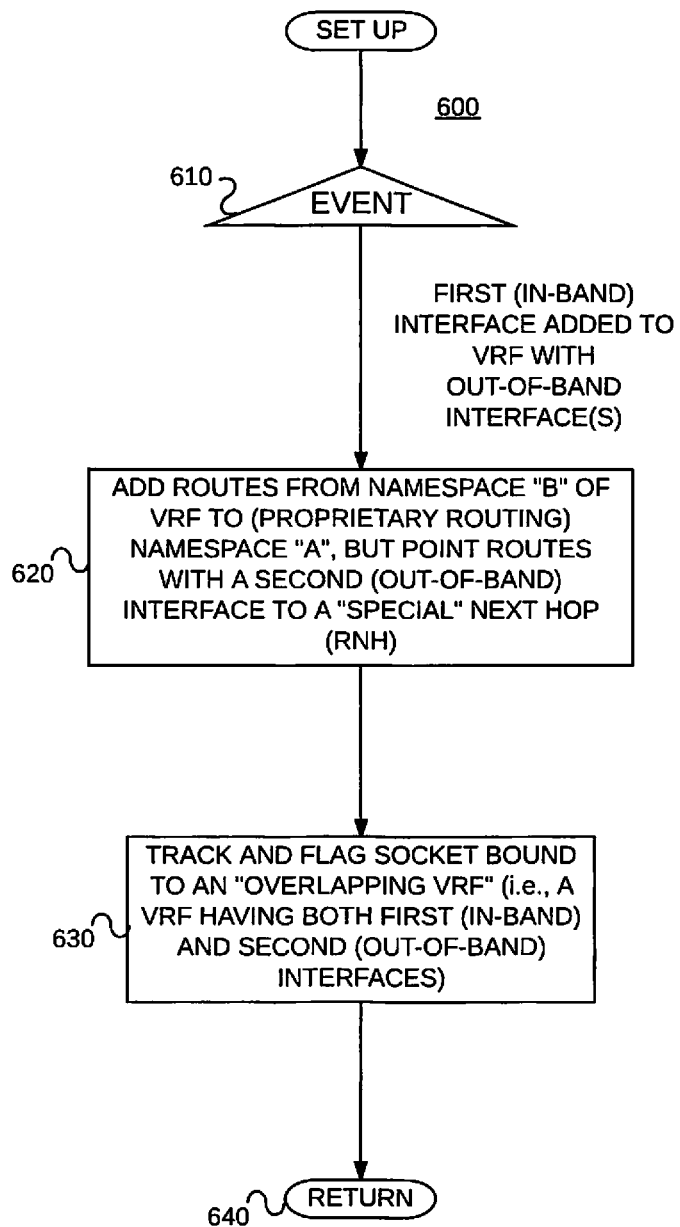
FIG. 6 is an example method for setting up a modified namespace.

Referring to the flow chart of FIG. 6, in an example set up method 600 consistent with the present invention, in the event that the first (e.g., in-band data plane) interface 340 is added to the VRF instance 395 (whereby the VRF instance 395 is associated with both the first (e.g., in-band data plane) interface 340 and the second (e.g., out-of-band control plane) interface 380) (Event 610), the example method 600 adds routes from the second namespace 390/500 to the first namespace 360/400 such that network address prefixes of the second namespace are associated with a "special" next hop. (Block 620) The shared session layer socket bound to the VRF is flagged. (Block 630) The example method 600 is then left. (Node 640) The data forwarding device is now set up (or configured) to forward egress data packets.

Figure 7:
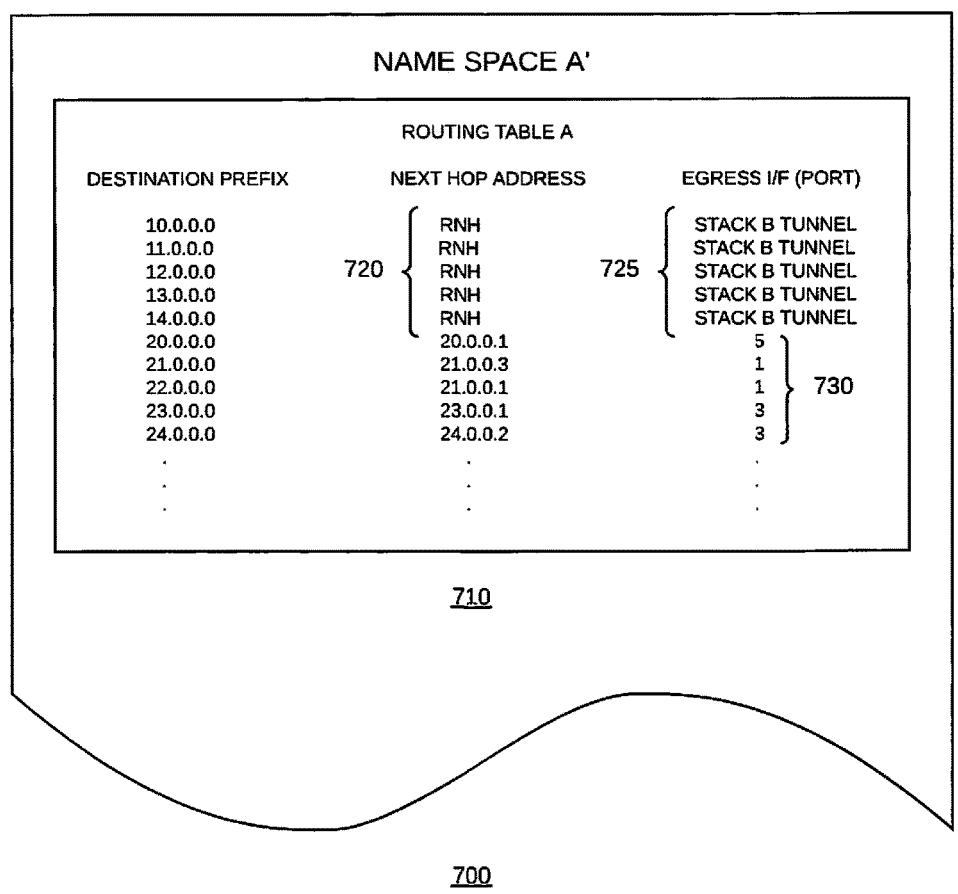
FIG. 7 is an example modified namespace determined, using the example method of FIG. 6, from the example namespace of FIG. 4.

Referring to block 620 and FIG. 7, the "special" next hop 720 may be a tunnel 725 to the second routing stack B 370.

Figure 8:
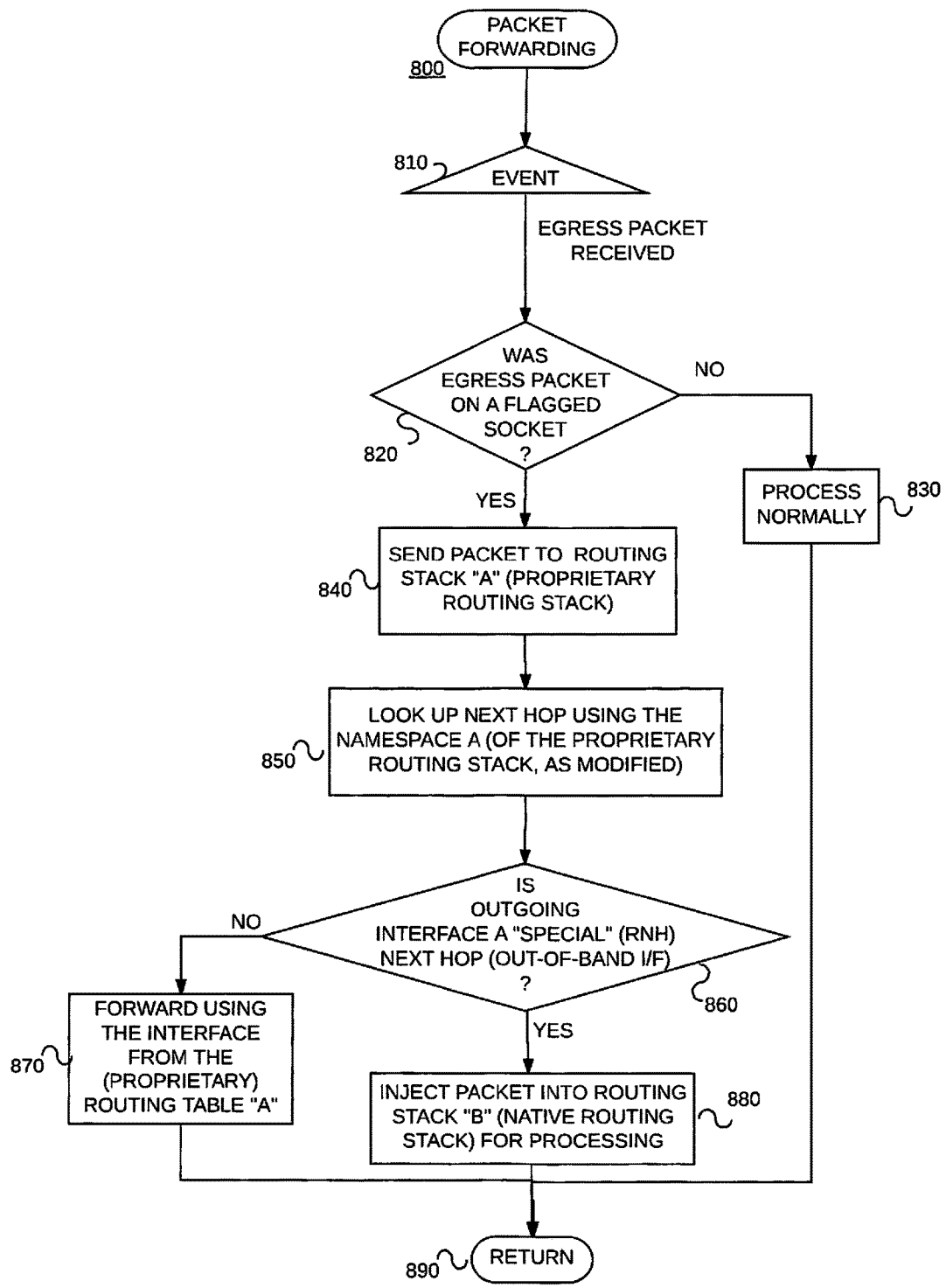
FIG. 8 is an example method for processing an egress packet in a manner consistent with the present invention.

Referring to flow chart of FIG. 8, an example method 800 consistent with the present invention may perform certain acts in the event that an egress packet is received. (Event 810) It is determined whether or not the egress packet is on a flagged socket. (Decision 820) If not, the egress packet is processed normally (Block 830) and the method 800 is left (Node 890). If, on the other hand, it is determined that the egress packet was on a flagged socket, the example method performs the following acts.

The egress packet is sent to the first routing stack A (e.g., a proprietary routing stack) 330 (Block 840), and the next hop is looked up using the namespace 700 of the proprietary routing stack A 330 as modified (Block 850). Recall, e.g., 710 of FIG. 7. It is determined whether or not the outgoing interface is a second interface (e.g., is an out-of-band interface) 380. (Block 860) That is, it is determined whether or not the outgoing interface is a "special" next hop. (See, e.g., the special next hop RNH 720 in FIG. 7.) If not, the egress packet is forwarded using the interface from the (e.g., proprietary) routing table (Block 870) before the example method 800 is left (Node 890). (See, e.g., 730 of FIG. 7.) If, on the other hand, it is determined that the outgoing interface is a "special" next hop (Recall 720 of FIG. 7.), the packet is injected into the second routing stack B (e.g., the native routing stack) for processing (Block 880) before the example method 800 is left (Node 890). (See, e.g., 725 of FIG. 7.)

§ 4.2 Operation Example of an Example Implementation

In the following example, the first routing stack A is a proprietary routing stack, the second routing stack B is a native routing stack, the first interface(s) is an in-band interface, and the second interface(s) is an out-of-band interface.

Referring back to FIG. 3, in one example implementation, the namespace A 360 of the proprietary routing stack 330 would contain VRF and associated objects (e.g., real time stream (rt), next hop (nh), interface family (iff), logical interface (ifl) and interface device (ifd)) for in-band (data plane 310) interfaces 340, whereas the namespace B 390 of the native routing stack 370 would contain VRF and associated objects for out-of-band (fxp0, internal interfaces like em0,em1) interfaces 380.

Figure 4:
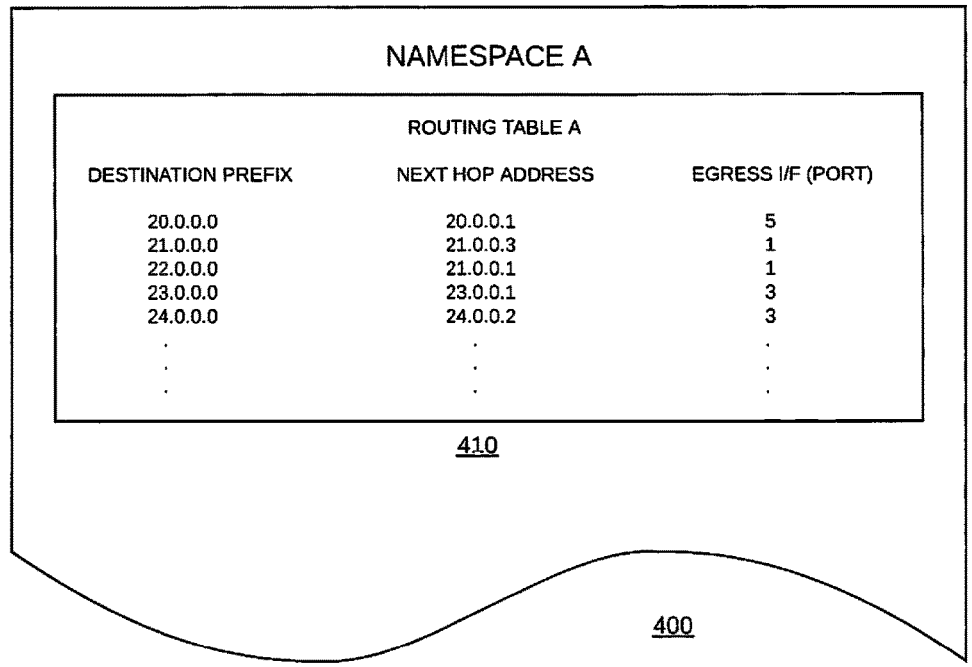
FIGS. 4 and 5 illustrate example namespaces in the example environment of FIG. 3.
Figure 5:
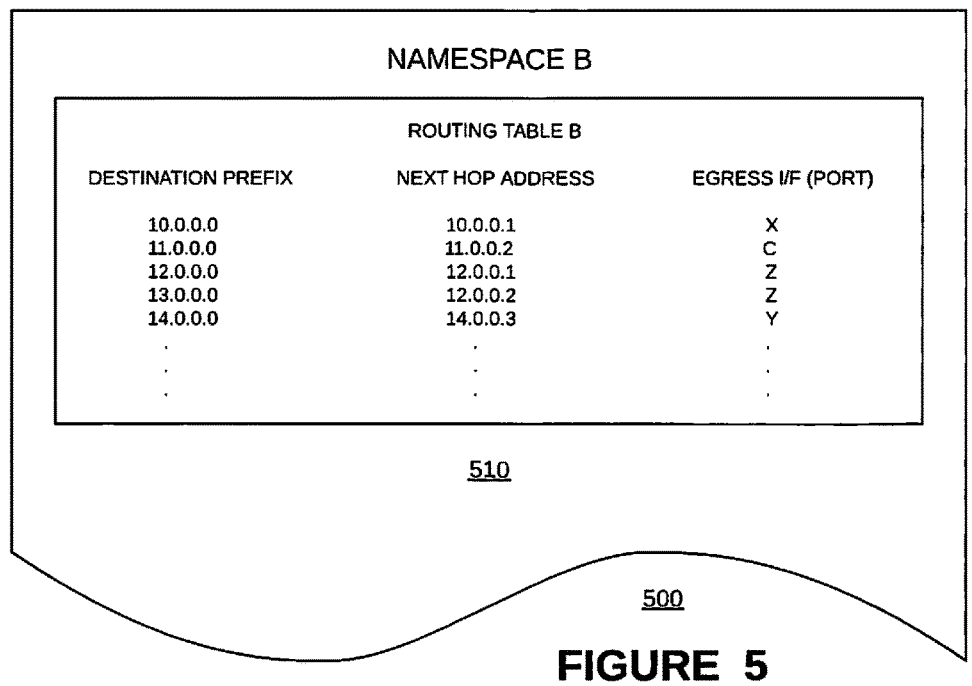

The addition of an in-band interface 340 to the VRF 395 that has only an out-of-band interface(s) 380 will trigger the creation of corresponding routing table in the proprietary routing namespace A 360 and automatically all the routes that were part of the corresponding VRF 395 in the native routing stack 370 will be added to this routing table. (Recall, e.g., 400 of FIG. 4 and 720 of FIG. 7.) That is, the overlapping VRF 395 will hold the routes for both in-band interface(s) 340 and out-of-band interface(s) 380 in the namespace 360 of the proprietary routing stack 330.

Since the proprietary routing stack 330 doesn't "own" the out-of-band interfaces 380, the routes that point via out-of-band interface 380 (that need to be forwarded via the native stack's forwarding table 390/510) will point to a special next hop (RNH) 720 that denotes an action to inject the packet to the native routing stack B 370 for forwarding the packets via the native routing infrastructure. The routing table 390/510 in the native routing stack infrastructure would hold the routes via these out-of-band interfaces with actual next hop information to forward the packet(s) via those interfaces 380.

Recall from 630 of FIG. 6 that the example method 600 uses a socket intercept library which tracks/flags the socket 350 that is bound to an overlapping VRF instance 395. When a packet is sent via the socket 350 that is bound to an overlapping VRF instance 395, the socket intercept layer would send the packet to the proprietary IP stack table 360'/710 for forwarding lookup. If the lookup yields a route that has it's outgoing interface via out-of-band interface 380 (RNH), the packet would be injected to the native IP routing stack 370. Otherwise, if the lookup yields a route that has its outgoing interface via a data plane 310 interface 340, the packet would be forwarded by the proprietary routing stack 330.

Note that ingress packets don't cause an issue since depending on the ingress interface, the corresponding IP stack infrastructure would be responsible for demultiplexing the packet to the socket layer 350.

The RNH next hop functionality is implementation dependent and can be implemented by a logical tunnel 725 between the two routing stack namespaces. If the destination address of an egress packet hits the RNH next hop 710, it could be sent via the logical tunnel 725 and on the egress side the destination address of the egress packet could be looked up at the native stack's 370 VRF instance 395. This would cause the packet to be forwarded out via the proper interface with the right encapsulation. The RNH next hop functionality could also be implemented via any other means that can inject the packet for lookup to the corresponding namespaces.

§ 4.3 Example Apparatus

Figure 9:
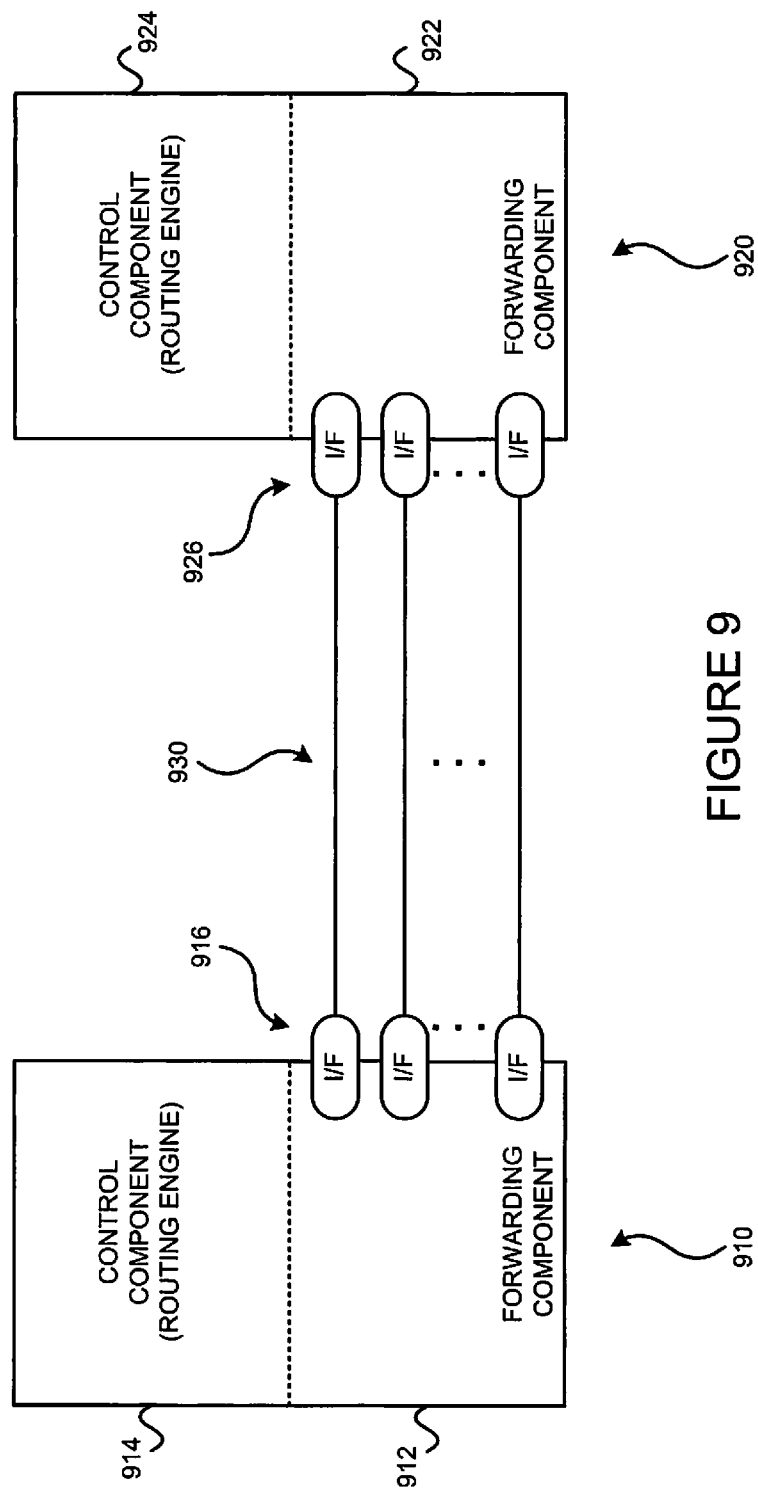
FIG. 9 illustrates an example environment including two systems coupled via communications links.

FIG. 9 illustrates two data forwarding systems 910 and 920 coupled via communications links 930. The links 930 may be physical links and/or "wireless" links. The data forwarding systems 910,920 may be routers for example. If the data forwarding systems 910,920 are example routers, each may include a control component (e.g., a routing engine) 914,924 and a forwarding component 912,922. Each data forwarding system 910,920 includes one or more interfaces 916,926 that terminate each of the one or more communications links 930.

As just discussed above, and referring to FIG. 10, some example routers 1000 include a control component (e.g., routing engine) 1010 and a packet forwarding component (e.g., a packet forwarding engine) 1090. Referring back to FIG. 3, the control component is provided in the control plane 320, while the packet forwarding component is provided in the data plane 310.

Figure 3:
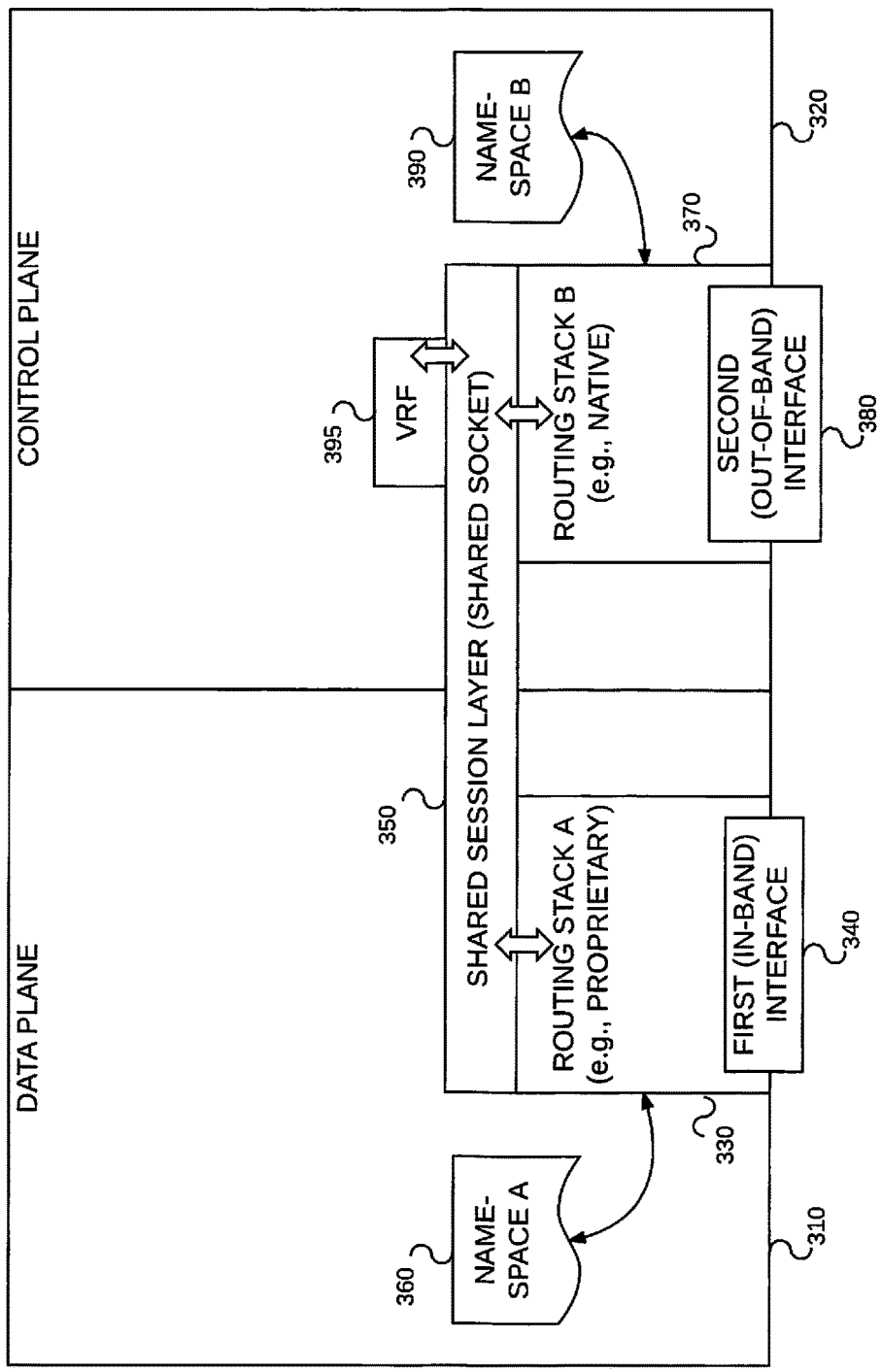
FIG. 3 illustrates an example environment in which methods and apparatus consistent with the present invention may be used.

The control component 1010 may include an operating system (OS) kernel 1020, routing protocol process(es) 1030 (Recall, e.g. the native routing stack 370 of FIG. 3.), label-based forwarding protocol process(es) 1040, interface process(es) 1050 (Recall, e.g., out-of-band interfaces 380 of FIG. 3.), user interface (e.g., command line interface) process(es) 1060, and chassis process(es) 1070, and may store routing table(s) 1039, label forwarding information 1045, and forwarding (e.g., route-based and/or label-based) table(s) 1080 (Recall, e.g., the namespace B 390 of FIG. 3.). As shown, the routing protocol process(es) 1030 may support routing protocols such as the routing information protocol ("RIP") 1031, the intermediate system-to-intermediate system protocol ("IS-IS") 1032, the open shortest path first protocol ("OSPF") 1033, the enhanced interior gateway routing protocol ("EIGRP") 1034 and the boarder gateway protocol ("BGP") 1035, and the label-based forwarding protocol process(es) 1040 may support protocols such as BGP 1035, the label distribution protocol ("LDP") 1036 and the resource reservation protocol ("RSVP") 1037. One or more components (not shown) may permit a user 1065 to interact with the user interface process(es) 1060. Similarly, one or more components (not shown) may permit an external device to interact with one or more of the routing protocol process(es) 1030, the label-based forwarding protocol process(es) 1040, the interface process(es) 1050, and the chassis process(es) 1070 (e.g., via SNMP 1085), and such processes may send information to an external device (e.g., via SNMP 1085).

The packet forwarding component 1090 may include a microkernel 1092, interface process(es) 1093 (Recall, e.g., in-band interface(s) of FIG. 3.), distributed ASICs 1094, chassis process(es) 1095 and forwarding (e.g., route-based and/or label-based) table(s) 1096 (Recall, e.g., the namespace A 360 of FIG. 3.).

Figure 10:
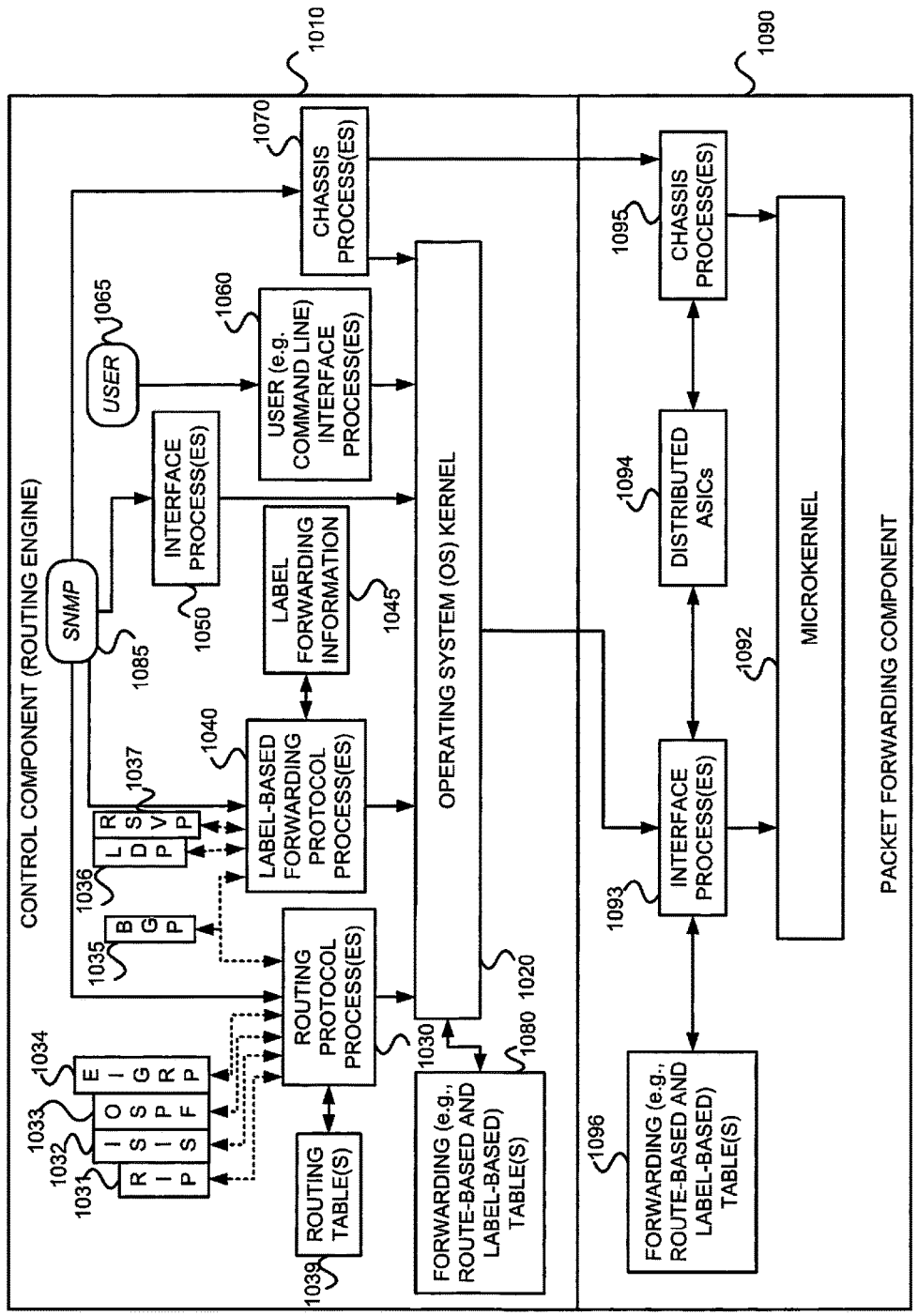
FIG. 10 is a block diagram of an example router on which the present invention may be implemented.

In the example router 1000 of FIG. 10, the control component 1010 handles tasks such as performing routing protocols, performing label-based forwarding protocols, control packet processing, etc., which frees the packet forwarding component 1090 to forward received packets quickly. That is, received control packets (e.g., routing protocol packets and/or label-based forwarding protocol packets) are not fully processed on the packet forwarding component 1090 itself, but are passed to the control component 1010, thereby reducing the amount of work that the packet forwarding component 1090 has to do and freeing it to process packets to be forwarded efficiently. Thus, the control component 1010 is primarily responsible for running routing protocols and/or label-based forwarding protocols, maintaining the routing tables and/or label forwarding information, sending forwarding table updates to the packet forwarding component 1090, and performing system management. The example control component 1010 may handle routing protocol packets, provide a management interface, provide configuration management, perform accounting, and provide alarms. The processes 1030, 1040, 1050, 1060 and 1070 may be modular, and may interact with the OS kernel 1020. That is, nearly all of the processes communicate directly with the OS kernel 1020. Using modular software that cleanly separates processes from each other isolates problems of a given process so that such problems do not impact other processes that may be running. Additionally, using modular software facilitates easier scaling.

Still referring to FIG. 10, the example OS kernel 1020 may incorporate an application programming interface ("API") system for external program calls and scripting capabilities. The control component 1010 may be based on an Intel PCI platform running the OS from flash memory, with an alternate copy stored on the router's hard disk. The OS kernel 1020 is layered on the Intel PCI platform and establishes communication between the Intel PCI platform and processes of the control component 1010. The OS kernel 1020 also ensures that the forwarding tables 1096 in use by the packet forwarding component 1090 are in sync with those 1080 in the control component 1010. Thus, in addition to providing the underlying infrastructure to control component 1010 software processes, the OS kernel 1020 also provides a link between the control component 1010 and the packet forwarding component 1090.

Referring to the routing protocol process(es) 1030 of FIG. 10, this process(es) 1030 provides routing and routing control functions within the platform. In this example, the RIP 1031, ISIS 1032, OSPF 1033 and EIGRP 1034 (and BGP 1035) protocols are provided. Naturally, other routing protocols may be provided in addition, or alternatively. Similarly, the label-based forwarding protocol process(es) 1040 provides label forwarding and label control functions. In this example, the LDP 1036 and RSVP 1037 (and BGP 1035) protocols are provided. Naturally, other label-based forwarding protocols (e.g., MPLS) may be provided in addition, or alternatively. In the example router 1000, the routing table(s) 1039 is produced by the routing protocol process(es) 1030, while the label forwarding information 1045 is produced by the label-based forwarding protocol process(es) 1040.

Still referring to FIG. 10, the interface process(es) 1050 performs configuration of the physical interfaces (Recall, e.g., 916 and 926 of FIG. 9.) and encapsulation.

The example control component 1010 may provide several ways to manage the router. For example, it 1010 may provide a user interface process(es) 1060 which allows a system operator 1065 to interact with the system through configuration, modifications, and monitoring. The SNMP 1085 allows SNMP-capable systems to communicate with the router platform. This also allows the platform to provide necessary SNMP information to external agents. For example, the SNMP 1085 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 1010, thereby avoiding slowing traffic forwarding by the packet forwarding component 1090.

Although not shown, the example router 1000 may provide for out-of-band management, RS-232 DB9 ports for serial console and remote management access, and tertiary storage using a removable PC card. (Recall, e.g., out-of-band interface(s) 380 of FIG. 3.) Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provides interaction with a command line interface ("CLI") 1060 via a console port, an auxiliary port, and/or a management Ethernet port The packet forwarding component 1090 is responsible for properly outputting received packets as quickly as possible. If there is no entry in the forwarding table for a given destination or a given label and the packet forwarding component 1090 cannot perform forwarding by itself, it 1090 may send the packets bound for that unknown destination off to the control component 1010 for processing. The example packet forwarding component 1090 is designed to perform Layer 2 and Layer 3 switching, route lookups, and rapid packet forwarding.

As shown in FIG. 10, the example packet forwarding component 1090 has an embedded microkernel 1092, interface process(es) 1093, distributed ASICs 1094, and chassis process(es) 1095, and stores a forwarding (e.g., route-based and/or label-based) table(s) 1096. The microkernel 1092 interacts with the interface process(es) 1093 and the chassis process(es) 1095 to monitor and control these functions. The interface process(es) 1092 has direct communication with the OS kernel 1020 of the control component 1010. This communication includes forwarding exception packets (Recall, e.g., egress packets whose destination points to an RNH next hop.) and control packets to the control component 1010, receiving packets to be forwarded, receiving forwarding table updates, providing information about the health of the packet forwarding component 1090 to the control component 1010, and permitting configuration of the interfaces from the user interface (e.g., CLI) process(es) 1060 of the control component 1010. The stored forwarding table(s) 1096 is static until a new one is received from the control component 1010. The interface process(es) 1093 uses the forwarding table(s) 1096 to look up next-hop information. The interface process(es) 1093 also has direct communication with the distributed ASICs 1094. Finally, the chassis process(es) 1095 may communicate directly with the microkernel 1092 and with the distributed ASICs 1094.

Figure 11:
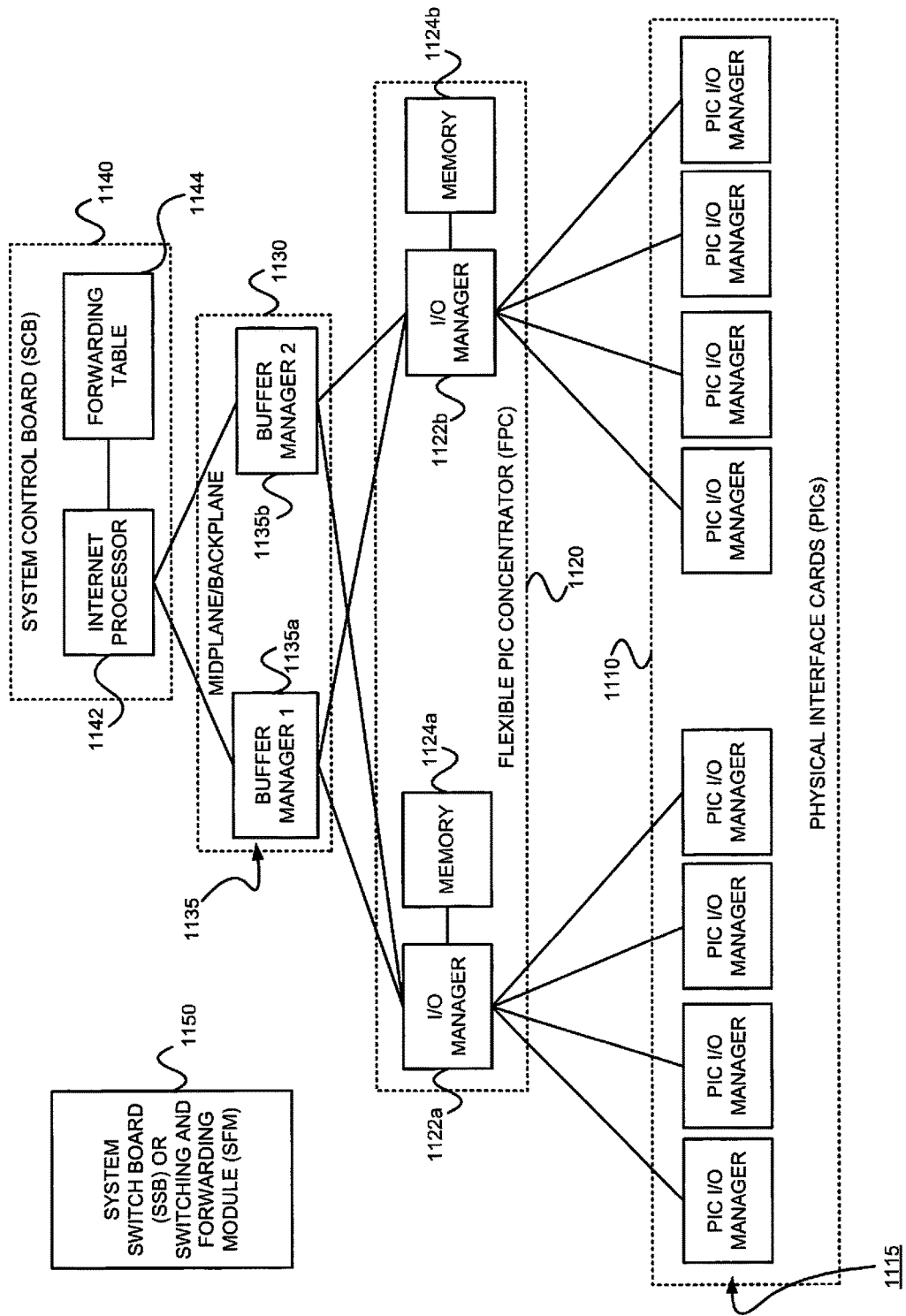
FIG. 11 is a block diagram of example distributed application specific integrated circuits ("ASICs") that may be provided in the example router of FIG. 10.

Referring back to distributed ASICs 1094 of FIG. 10, FIG. 11 is an example of how the ASICS may be distributed in the packet forwarding component 1090 to divide the responsibility of packet forwarding. As shown in FIG. 11, the ASICs of the packet forwarding component 1090 may be distributed on physical interface cards (PICs) 1110, flexible PIC concentrators (FPCs) 1120, a midplane or backplane 1130, and a system control board(s) 1140 (for switching and/or forwarding). Switching fabric is also shown as a system switch board (SSB), or a switching and forwarding module (SFM) 1150. Each of the PICs 1110 includes one or more PIC I/O managers 1115. Each of the FPCs 1120 includes one or more I/O managers 1122, each with an associated memory 1124. The midplane/backplane 1130 includes buffer managers 1135a, 1135b. Finally, the system control board 1140 includes an Internet processor 1142 and an instance of the forwarding table 1144 (Recall, e.g., 1096 of FIG. 10).

Still referring to FIG. 11, the PICs 1110 contain the interface ports. Each PIC 1110 may be plugged into an FPC 1120. Each individual PIC 1110 may contain an ASIC that handles media-specific functions, such as framing or encapsulation. Some example PICs 1110 provide SDH/SONET, ATM, Gigabit Ethernet, Fast Ethernet, and/or DS3/E3 interface ports.

An FPC 1120 can contain from one or more PICs 1110, and may carry the signals from the PICs 1110 to the midplane/backplane 1130 as shown in FIG. 11.

The midplane/backplane 1130 holds the line cards. The line cards may connect into the midplane/backplane 1130 when inserted into the example router's chassis from the front. The control component (e.g., routing engine) 1010 may plug into the rear of the midplane/backplane 1130 from the rear of the chassis. The midplane/backplane 1130 may carry electrical (or optical) signals and power to each line card and to the control component 1010.

The system control board 1140 may perform forwarding lookup. It 1140 may also communicate errors to the routing engine. Further, it 1140 may also monitor the condition of the router based on information it receives from sensors. If an abnormal condition is detected, the system control board 1140 may immediately notify the control component 1010.

Referring to FIGS. 11, 12A and 12B, in some exemplary routers, each of the PICs 1110,610' contains at least one I/O manager ASIC 1115 responsible for media-specific tasks, such as encapsulation. The packets pass through these I/O ASICs on their way into and out of the router. The I/O manager ASIC 1115 on the PIC 1110,1110' is responsible for managing the connection to the I/O manager ASIC 1122 on the FPC 1120,1120', managing link-layer framing and creating the bit stream, performing cyclical redundancy checks ("CRCs"), and detecting link-layer errors and generating alarms, when appropriate. The FPC 1120 includes another I/O manager ASIC 1122. This ASIC 1122 takes the packets from the PICs 1110 and breaks them into (e.g., 114-byte) memory blocks. This FPC I/O manager ASIC 1122 sends the blocks to a first distributed buffer manager (DBM) 1135a', decoding encapsulation and protocol-specific information, counting packets and bytes for each logical circuit, verifying packet integrity, and applying class of service ("CoS") rules to packets. At this point, the packet is first written to memory. More specifically, the example DBM ASIC 1135a' manages and writes packets to the shared memory 1124 across all FPCs 1120. In parallel, the first DBM ASIC 1135a' also extracts information on the destination of the packet and passes this forwarding-related information to the Internet processor 1142/1142'. The Internet processor 1142/1142' performs the route lookup using the forwarding table 1144 and sends the information over to a second DBM ASIC 1135b'. The Internet processor ASIC 1142/642' also collects exception packets (i.e., those without a forwarding table entry) and sends them to the control component 1010. The second DBM ASIC 1135b' then takes this information and the 114-byte blocks and forwards them to the I/O manager ASIC 1122 of the egress FPC 1120/1120' (or multiple egress FPCs, in the case of multicast) for reassembly. (Thus, the DBM ASICs 1135a' and 1135b' are responsible for managing the packet memory 1124 distributed across all FPCs 1120/1120', extracting forwarding-related information from packets, and instructing the FPC where to forward packets.)

The I/O manager ASIC 1122 on the egress FPC 1120/1120' may perform some value-added services. In addition to incrementing time to live (TTL) values and re-encapsulating the packet for handling by the PIC 1110, it can also apply class-of-service ("CoS") rules. To do this, it may queue a pointer to the packet in one of the available queues, each having a share of link bandwidth, before applying the rules to the packet. Queuing can be based on various rules. Thus, the I/O manager ASIC 1122 on the egress FPC 1120/1120' may be responsible for receiving the blocks from the second DBM ASIC 1135b', incrementing TTL values, queuing a pointer to the packet, if necessary, before applying CoS rules, re-encapsulating the blocks, and sending the encapsulated packets to the PIC I/O manager ASIC 1115.

Figure 13:
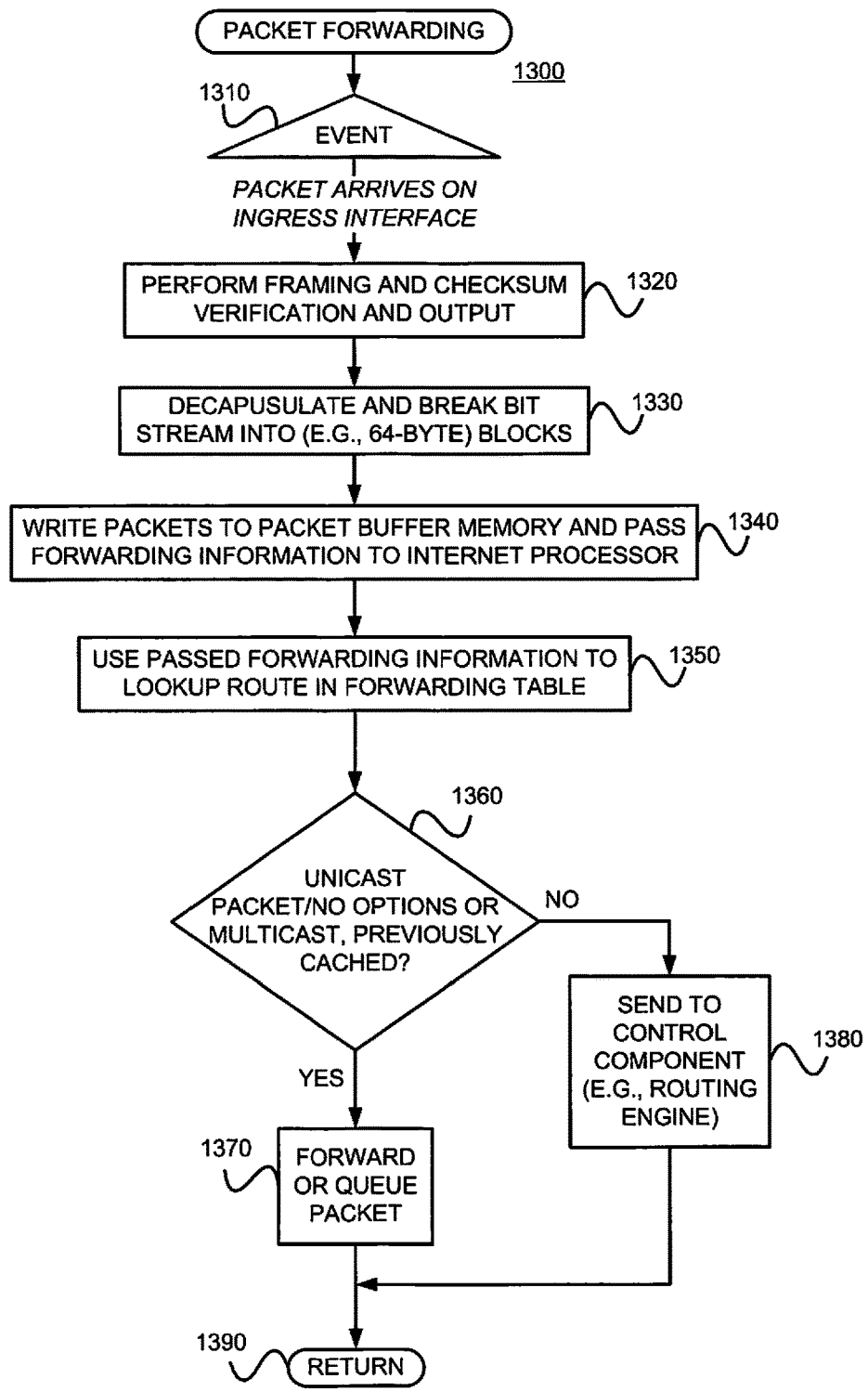
FIG. 13 is a flow diagram of an example packet forwarding method that may be implemented on any of the example routers of FIGS. 10 and 11.

FIG. 13 is a flow diagram of an example method 1300 for providing packet forwarding in the example router. The main acts of the method 1300 are triggered when a packet is received on an ingress (incoming) port or interface. (Event 1310) The types of checksum and frame checks that are required by the type of medium it serves are performed and the packet is output, as a serial bit stream. (Block 1320) The packet is then decapsulated and parsed into (e.g., 64-byte) blocks. (Block 1330) The packets are written to buffer memory and the forwarding information is passed on the Internet processor. (Block 1340) The passed forwarding information is then used to lookup a route in the forwarding table. (Block 1350) Note that the forwarding table can typically handle unicast packets that do not have options (e.g., accounting) set, and multicast packets for which it already has a cached entry. Thus, if it is determined that these conditions are met (YES branch of Decision 1360), the packet forwarding component finds the next hop and egress interface, and the packet is forwarded (or queued for forwarding) to the next hop via the egress interface (Block 1370) before the method 1300 is left (Node 1390) This method 1300 may be modified in order to include performance of the example method 800 of FIG. 8. Otherwise, if these conditions are not met (NO branch of Decision 1360), the forwarding information is sent to the control component 1010 for advanced forwarding resolution (Block 1380) before the method 1300 is left (Node 1390).

Referring back to block 1370, the packet may be queued. Actually, as stated earlier with reference to FIG. 11, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 1122 may send a request for the packet to the second DBM ASIC 1135b. The DBM ASIC 1135 reads the blocks from shared memory and sends them to the I/O manager ASIC 1122 on the FPC 1120, which then serializes the bits and sends them to the media-specific ASIC of the egress interface. The I/O manager ASIC 1115 on the egress PIC 1110 may apply the physical-layer framing, perform the CRC, and send the bit stream out over the link.

Referring back to block 1380 of FIG. 13, as well as FIG. 11, regarding the transfer of control and exception packets, the system control board 1140 handles nearly all exception packets. For example, the system control board 1140 may pass exception packets to the control component 1010.

Although example embodiments consistent with the present invention may be implemented on the example routers of FIG. 9 or 10 (Note, especially, the control components 914 and 924 of FIG. 9 and the routing protocols 1030, 1035 and 1036 of FIG. 10.), embodiments consistent with the present invention may be implemented on communications network nodes having different architectures. More generally, embodiments consistent with the present invention may be implemented on an example system 1400 as illustrated on FIG. 14.

Figure 14:
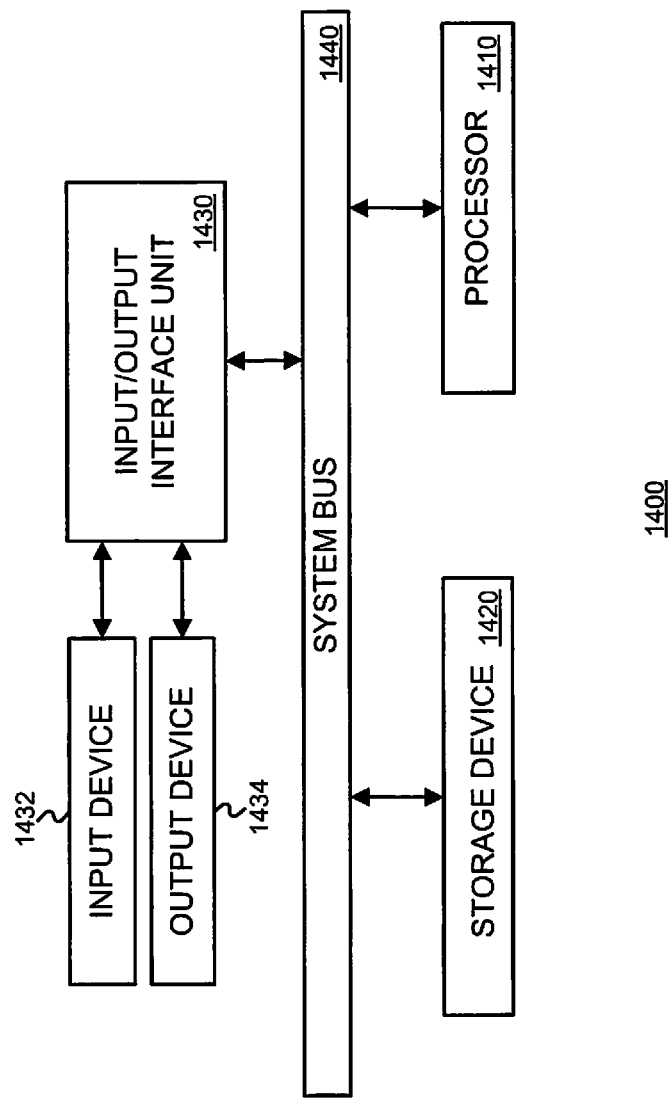
FIG. 14 is a block diagram of an example processor-based system that may be used to execute the example methods for processing an egress packet and/or to store information used and/or generated by such example methods.

FIG. 14 is a block diagram of an exemplary machine 1400 that may perform one or more of the processes described, and/or store information used and/or generated by such processes. The exemplary machine 1400 includes one or more processors 1410, one or more input/output interface units 1430, one or more storage devices 1420, and one or more system buses and/or networks 1440 for facilitating the communication of information among the coupled elements. One or more input devices 1432 and one or more output devices 1434 may be coupled with the one or more input/output interfaces 1430. The one or more processors 1410 may execute machine-executable instructions to effect one or more aspects of the present invention. At least a portion of the machine executable instructions may be stored (temporarily or more permanently) on the one or more storage devices 1420 and/or may be received from an external source via one or more input interface units 1430. The machine executable instructions may be stored as various software modules, each module performing one or more operations. Functional software modules are examples of components of the invention.

In some embodiments consistent with the present invention, the processors 1410 may be one or more microprocessors and/or ASICs. The bus 1440 may include a system bus. The storage devices 1420 may include system memory, such as read only memory (ROM) and/or random access memory (RAM). The storage devices 1420 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present invention might be implemented in hardware, such as one or more field programmable gate arrays ("FPGA"s), one or more integrated circuits such as ASICs, one or more network processors, etc. Alternatively, or in addition, embodiments consistent with the present invention might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

As should be appreciated from the foregoing description, an example data forwarding device consistent with the present invention may include: (a) a data plane component including a first routing stack associated with a first namespace and a first (e.g., in-band data plane) interface; (b) a control plane component including a second routing stack associated with a second namespace and a second (e.g., out-of-band control plane) interface, wherein at least some forwarding information included in the second namespace is incompatible with the first routing stack; (c) a virtual routing and forwarding instance (VRF); (d) a shared session layer socket associated with both the first routing stack and the second routing stack, and bound with the VRF, wherein the VRF is associated with the second interface via the second routing stack; and (e) a packet processing module. The packet processing module is adapted to, responsive to adding of the first interface to the VRF (whereby the VRF is associated with both the first (e.g., in-band data plane) interface and the second (e.g., out-of-band control plane) interface, (1) add routes from the second namespace to the first namespace such that network address prefixes of the second namespace are associated with a "special" next hop, and (2) flag the shared session layer socket associated with the VRF. That is, the packet processing module can set up the routing table of the first (e.g., proprietary) routing stack. The packet processing module may be further adapted to (1) receive an egress packet, (2) determine whether or not the egress packet is on the flagged shared session layer socket, and (3) responsive to determining that the egress packet is on the flagged shared session layer socket, (A) send the egress packet to the first routing stack for processing, wherein the first routing stack (i) looks up next hop information using the (modified) first namespace of the first routing stack, (ii) determines whether or not the next hop information is a "special" next hop, and (iii) responsive to a determination that the next hop information is a "special" next hop, injects the egress packet into the second routing stack for processing. Otherwise, responsive to a determination that the next hop information is not a "special" next hop, the packet processing module simply forwards the egress packet using the next hop information.

§ 4.4 Refinements, Alternatives and Extensions

In some example embodiments consistent with the present invention, the first routing stack is a proprietary routing stack and the second routing stack is a native routing stack.

In some example embodiments consistent with the present invention, the second interface is an out-of-band control plane interface which is used by a remote management protocol. For example, the out-of-band control plane interface may be one of (A) an internal Ethernet interface, and (B) an external, remote management, Ethernet interface. In some example embodiments, the VRF uses the both the in-band data plane interface and the out-of-band control plane interface to provide redundancy in a management protocol (e.g., Terminal Access Controller Access Control System (TACACS) or Network Time Protocol (NTP)).

In some example embodiments consistent with the present invention, when the destination address of the egress packet is a "special" next hop, the packet is injected into the second routing stack, via a logical tunnel, for processing. Other means for injecting the packet into the second routing stack (e.g., via shared memory message passing, etc.) are possible.

In some example embodiments consistent with the present invention, the first namespace includes a first forwarding information base (FIB) and wherein the second namespace includes a second FIB.

§ 4.5 Conclusions

As should be appreciated from the foregoing, example embodiments consistent with the present invention advantageously handles the problem of processing an egress packet by a data forwarding device having (1) a first routing stack associated with a first namespace and a first (e.g., in-band data plane) interface, (2) a second routing stack associated with a second namespace and a second (e.g., out-of-band control plane) interface, wherein at least some forwarding information included in the second namespace is incompatible with the first routing stack, (3) a virtual routing and forwarding instance (VRF), and (4) a shared session layer socket associated with both the first routing stack and the second routing stack, and bound to the VRF, where the VRF is associated with the second (e.g., out-of-band control plane) interface via the second routing stack.

What is claimed is:

1. A computer-implemented method for controlling the forwarding of egress packets in a data forwarding device having a first routing stack associated with a first namespace and a first interface, a second routing stack associated with a second namespace and a second interface, wherein at least some forwarding information included in the second namespace is incompatible with the first routing stack, a virtual routing and forwarding instance (VRF), and a shared session layer socket associated with both the first routing stack and the second routing stack, and bound to the VRF, wherein the VRF is associated with the second interface via the second routing stack, the computer-implemented method comprising:

a) adding the first interface to the VRF whereby the VRF is associated with both the first interface and the second interface; and b) responsive to the adding of the first interface to the VRF, 1) adding routes from the second namespace to the first namespace such that network address prefixes of the second namespace are associated with a special next hop, and 2) flagging the shared session layer socket bound to the VRF.

2. The computer-implemented method of claim 1 further comprising:

c) receiving an egress packet;

d) determining whether or not the egress packet is on the flagged shared session layer socket; and e) responsive to determining that the egress packet is on the flagged shared session layer socket, 1) sending the egress packet to the first routing stack for processing;

2) looking up next hop information using the first namespace of the first routing stack, 3) determining whether or not the next hop information is a special next hop, and 4) responsive to a determination that the next hop information is a special next hop, injecting the egress packet into the second routing stack for processing, otherwise, responsive to a determination that the next hop information is not a special next hop, forwarding the egress packet by the first routing stack using the next hop information.

3. The computer-implemented method of claim 2 wherein the egress packet is injected into the second routing stack, via a logical tunnel, for processing.

4. The computer-implemented method of claim 1 wherein the first routing stack is a proprietary routing stack and the second routing stack is a native routing stack.

5. The computer-implemented method of claim 1 wherein the second interface is an out-of-band control plane interface which is used by a remote management protocol.

6. The computer-implemented method of claim 1 wherein the second interface is an out-of-band control plane interface which is one of (A) an internal Ethernet interface, and (B) an external, remote management, Ethernet interface.

7. The computer-implemented method of claim 1 wherein the first interface is an in-band data plane interface and the second interface is an out-of-band control plane interface.

8. The computer-implemented method of claim 7 wherein the VRF uses the both the in-band data plane interface and the out-of-band control plane interface to provide redundancy in a management protocol.

9. The computer-implemented method of claim 8 wherein the management protocol is one of Terminal Access Controller Access Control System (TACACS) and Network Time Protocol (NTP).

10. The computer-implemented method of claim 1 wherein the first namespace includes a first forwarding information base (FIB) and wherein the second namespace includes a second FIB.

11. A data forwarding device comprising:

a) a data plane component including a first routing stack associated with a first namespace and an in-band data plane interface;

b) a control plane component including a second routing stack associated with a second namespace and an out-of-band control plane interface, wherein at least some forwarding information included in the second namespace is incompatible with the first routing stack;

c) a virtual routing and forwarding instance (VRF);

d) a shared session layer socket associated with both the first routing stack and the second routing stack, and bound to the VRF, wherein the VRF is associated with the out-of-band control plane interface via the second routing stack; and e) a packet processing module which is adapted to, responsive to adding of the in-band data plane interface to the VRF whereby the VRF is associated with both the in-band data plane interface and the out-of-band control plane interface, 1) add routes from the second namespace to the first namespace such that network address prefixes of the second namespace are associated with a special next hop, and 2) flag the shared session layer socket bound to the VRF.

12. The data forwarding device of claim 11 wherein the packet processing module is further adapted to 3) receive an egress packet, 4) determine whether or not the egress packet is on the flagged shared session layer socket, and 5) responsive to determining that the egress packet is on the flagged shared session layer socket, A) send the egress packet to the first routing stack for processing, wherein the first routing stack i) looks up next hop information using the first namespace of the first routing stack, ii) determines whether or not the next hop information is a special next hop, and iii) responsive to a determination that the next hop information is a special next hop, injects the egress packet into the second routing stack for processing, and otherwise, responsive to a determination that the next hop information is not a special next hop, forwards the egress packet using the next hop information.

13. A non-transitory computer-readable storage medium storing processor-executable instructions for controlling the forwarding of egress packets in a data forwarding device having a first routing stack associated with a first namespace and a first interface, a second routing stack associated with a second namespace and a second interface, wherein at least some forwarding information included in the second namespace is incompatible with the first routing stack, a virtual routing and forwarding instance (VRF), and a shared session layer socket associated with both the first routing stack and the second routing stack, and bound to the VRF, wherein the VRF is associated with the second interface via the second routing stack,
the processor executable instructions, when executed by at least one processor, cause the at least one processor to perform a method comprising:
  a) adding the first interface to the VRF whereby the VRF is associated with both the first interface and the second interface; and
  b) responsive to the adding of the first interface to the VRF,
    1) adding routes from the second namespace to the first namespace such that network address prefixes of the second namespace are associated with a special next hop, and
    2) flagging the shared session layer socket bound to the VRF.

14. The non-transitory computer-readable medium of claim 13 wherein the method further comprises:
  c) receiving an egress packet;
  d) determining whether or not the egress packet is on the flagged shared session layer socket; and
  e) responsive to determining that the egress packet is on the flagged shared session layer socket,
    1) sending the egress packet to the first routing stack for processing;
    2) looking up next hop information using the first namespace of the first routing stack,
    3) determining whether or not the next hop information is a special next hop, and
    4) responsive to a determination that the next hop information is a special next hop,
      injecting the egress packet into the second routing stack for processing,
    otherwise, responsive to a determination that the next hop information is not a special next hop,
      forwarding the egress packet by the first routing stack using the next hop information.

15. The non-transitory computer-readable medium of claim 14 wherein the egress packet is injected into the second routing stack, via a logical tunnel, for processing.

16. The non-transitory computer-readable medium of claim 13 wherein the first routing stack is a proprietary routing stack and the second routing stack is a native routing stack.

17. The non-transitory computer-readable medium of claim 13 wherein the second interface is an out-of-band control plane interface which is used by a remote management protocol.

18. The non-transitory computer-readable medium of claim 13 wherein the first interface is an in-band data plane interface and the second interface is an out-of-band control plane interface.

19. The non-transitory computer-readable medium of claim 13 wherein the VRF uses the both the in-band data plane interface and the out-of-band control plane interface to provide redundancy in a management protocol.

20. The non-transitory computer-readable medium of claim 13 wherein the first namespace includes a first forwarding information base (FIB) and wherein the second namespace includes a second FIB.

\* \* \* \* \*